US012743409B2

(12) United States Patent
Mayo

(10) Patent No.: US 12,743,409 B2
(45) Date of Patent: Sep. 22, 2026

(54) ESTIMATED STORAGE COST FOR A DEDUPLICATION STORAGE SYSTEM

(71) Applicant: HEWLETT PACKARD ENTERPRISE DEVELOPMENT LP, Spring, TX (US)

(72) Inventor: Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 248 days.

(21) Appl. No.: 18/185,190

(22) Filed: Mar. 16, 2023

(65) Prior Publication Data

US 2024/0311361 A1 Sep. 19, 2024

(51) Int. Cl.
*G06F 15/16* (2006.01)
*G06F 16/215* (2019.01)
*G06F 16/23* (2019.01)
*G06F 16/27* (2019.01)

(52) U.S. Cl.
CPC ........ *G06F 16/2329* (2019.01); *G06F 16/215* (2019.01); *G06F 16/27* (2019.01)

(58) Field of Classification Search
None
See application file for complete search history.

(56) References Cited

U.S. PATENT DOCUMENTS 9,436,292 B1 9/2016 Douglis et al.
9,646,043 B1 * 5/2017 Aronovich ............ G06F 16/951
10,866,750 B2 12/2020 Chopra et al.
11,308,035 B2 4/2022 Prahlad et al.
2016/0132523 A1 * 5/2016 Traeger ............... G06F 16/1748 707/692
2020/0341650 A1 * 10/2020 Jayaraman ............ G06F 3/0608
2021/0303406 A1 * 9/2021 Malamut ............. G06F 11/1453

OTHER PUBLICATIONS

Berman, A., et al.; "Accelerating Duplicate Data Chunk Recognition Using NN Trained by Locality-Sensitive Hash"; Oct. 11, 2010; 5 pages.
Tan, Y., et al.; "SAM: A Semantic-Aware Multi-Tiered Source De-duplication Framework for Cloud Backup"; Jan. 12, 2015; 10 pages.

* cited by examiner

*Primary Examiner* — Alex Gofman
(74) *Attorney, Agent, or Firm* — Trop, Pruner & Hu, P.C.

(57) ABSTRACT

Example implementations relate to deduplication operations in a storage system. An example includes receiving a stream of data units to be stored in a persistent storage of a deduplication storage system; determining an estimated matching cost of performing, on a set of data units of the received stream, a matching process of a deduplication operation of the deduplication storage system to generate a deduplicated version of the set of data units; determining an estimated storage cost for a non-deduplicated version of the set of data units that has not been deduplicated via the deduplication operation; and in response to a determination that the estimated storage cost exceeds the estimated matching cost, performing the matching process on the set of data units, the matching process using metadata of the deduplication storage system.

20 Claims, 11 Drawing Sheets

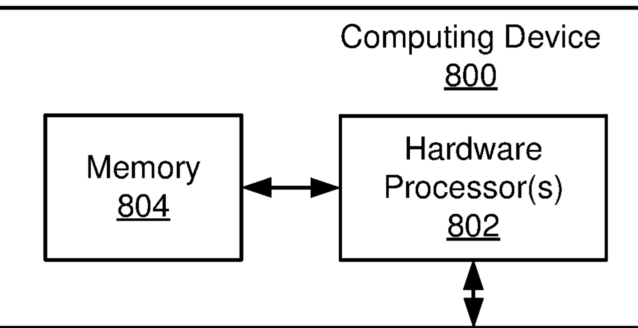

Machine Readable Storage Medium
805

810
Receive a stream of data units to be stored in a persistent storage of a deduplication storage system 820
Determine an estimated matching cost of performing, on a set of data units of the received stream, a matching process of a deduplication operation of the deduplication storage system to generate a deduplicated version of the set of data units 830
Determine an estimated storage cost for a non-deduplicated version of the set of data units that has not been deduplicated via the deduplication operation 840
In response to a determination that the estimated storage cost exceeds the estimated matching cost, perform the matching process on the set of data units, the matching process using metadata of the deduplication storage system

ESTIMATED STORAGE COST FOR A DEDUPLICATION STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIG. 8 is a schematic diagram of an example computing device, in accordance with some implementations.

FIG. 10 is a diagram of an example machine-readable medium storing instructions in accordance with some implementations.

Figure 1:
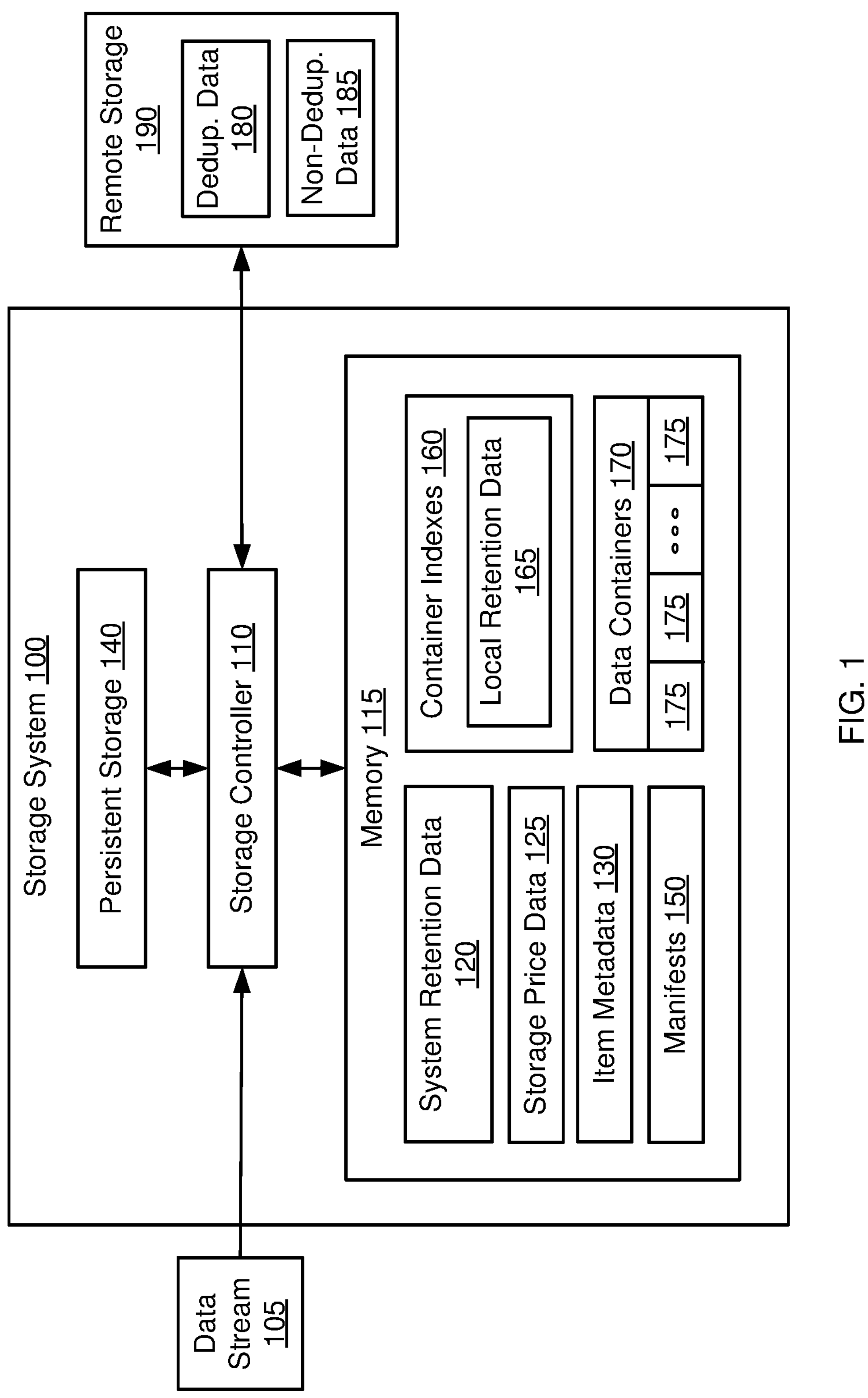
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream"). Further, in some examples, the storage system may backup at least a portion of the data stream in deduplicated form, to thereby reduce the amount of storage space occupied by storage of the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a storage system may use metadata for processing inbound data streams (e.g., backup items). For example, such metadata may include data recipes (also referred to herein as "manifests") that specify the order in which particular data units are received for each backup item. Further, such metadata may include item metadata to represent each received backup item (e.g., a data stream) in a deduplicated form. The item metadata may include identifiers for a set of manifests, and may indicate the sequential order of the set of manifests. The processing of each backup item may be referred to herein as a "backup process." Subsequently, in response to a read request, the storage system may use the item metadata and the set of manifests to determine the received order of data units, and may thereby recreate the original data stream of the backup item. Accordingly, the set of manifests may be a representation of the original backup item. The manifests may include a sequence of records, with each record representing a particular set of data unit(s). The records of the manifest may include one or more fields that identify container indexes that index (e.g., include storage information for) the data units. For example, a container index may include one or more fields that specify location information (e.g., containers, offsets, etc.) for the stored data units, compression and/or encryption characteristics of the stored data units, and so forth. Further, the container index may include reference counts that indicate the number of manifests that reference each data unit.

In some examples, upon receiving a data unit (e.g., in a data stream), it may be matched against one or more container indexes to determine whether an identical chunk is already stored in a container of the storage system. For example, the storage system may compare the fingerprint of the received data unit against the fingerprints in one or more container indexes. As used herein, the term "matching operation" may refer to an operation to compare fingerprints of a collection of multiple data units (e.g., from a particular backup data stream) against fingerprints stored in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry may be incremented, and the received data unit is not stored in a container (as it is already present in one of the containers), thereby avoiding storing a duplicate data unit in the storage system. The ratio of the original data stream size to the size of its deduplicated representation may be referred to herein as the "deduplication ratio" of the system. In some examples, the deduplication ratio of the storage system may indicate a relative financial benefit of using deduplication (e.g., the financial cost savings from reducing the amount of storage resources needed to store a specified amount of data).

In some examples, the storage system may identify a set or list of container indexes (referred to herein as the "candidate list") to use for matching operations for the segment (i.e., for fingerprints of data blocks of the segment). Further, the storage system may sort the container indexes (also referred to as the "candidate container indexes") in the candidate list according to the predicted number of matches to be found in each candidate container index for the segment. The storage system may traverse the candidate list in the sorted order to select and process one candidate container index at a time.

In some examples, a storage system may persistently store the received data and associated metadata in a remote storage service (e.g., a "cloud" or network storage service), rather than in a local filesystem. In such examples, deduplicating a received data stream may include, in part, performing a "GET" transfer operation to retrieve at least one container index, loading the container index into memory, performing a matching operation against the container index, updating the container index, and then performing a "PUT" transfer operation to move the updated container index from memory to the remote storage. However, in some examples, the remote storage service may impose financial charges for the "GET" and "PUT" transfer operations performed to deduplicate the received data (e.g., based on the number of individual transfers, size of transfers, type of transfers, and so forth). Further, the remote storage service may also impose financial charges for storing the data (e.g., based on amount of data stored, amount of time stored, and so forth). Therefore, implementing a storage system using a remote storage service may incur various financial costs. Further, in some examples, the financial costs incurred for remote storage may exceed the financial benefits (e.g., cost reductions) obtained by using deduplication to store the data.

In accordance with some implementations of the present disclosure, a storage system may receive a stream of data units to be stored in persistent storage. The storage system may estimate a cost (also referred to herein as "matching cost" or "match cost") for performing a matching operation to deduplicate the received data units. For example, the matching cost may include financial charges for transferring metadata to and from a remote storage service. Further, the storage system may also estimate a cost to store a non-deduplicated version of the data units (also referred to as the "storage cost") in persistent storage. For example, the storage cost may include financial charges for storing a given amount of data for a particular time period. As used herein, the terms "non-deduplicated version" or "non-deduplicated form" may refer to data that is stored without performing a deduplication process for the data (e.g., without performing a matching operation). In some implementations, the storage system may determine the estimated storage cost based at least on information indicating the time periods that data units are historically stored in the persistent storage (also referred to as the "expected retention time" of the data units). For example, the expected retention time may be calculated as a moving average of the time periods that data units were previously stored in the persistent storage.

In some implementations, the storage system may compare the estimated storage cost to the estimated matching cost. If it is determined that the estimated storage cost exceeds the estimated matching cost, the storage system may perform the matching operation on the data units (e.g., to generate a deduplicated version of the data units). Otherwise, if it is determined that the estimated storage cost does not exceed the estimated matching cost, the storage system may not perform the matching operation, but instead may store a non-deduplicated version of the data units in persistent storage.

In some implementations, when receiving the stream of data units, the storage system may traverse a candidate list in a sorted order (e.g., in descending order of predicted matches to the received data units), and may select one candidate container index at a time. For each selected candidate container index, the storage system may compare the estimated storage cost to the estimated matching cost for that candidate container index, and thereby determine whether to perform deduplication using that candidate container index (e.g., by performing a matching operation of the data units against that candidate container index). Further, because the candidate container indexes that are selected earlier (e.g., having higher sorted position in the candidate list) are predicted to have higher numbers of matches than the candidate container indexes that are selected later (e.g., having lower sorted positions in the candidate list), it may be predicted that the candidate container indexes that are selected earlier will have a lower estimated matching cost than the candidate container indexes that are selected later. Therefore, upon determining that a currently-selected candidate container index has an estimated matching cost that exceeds the estimated storage cost, all remaining candidate container indexes (e.g., having lower sorted positions than the currently-selected candidate container list) may be assumed to also have matching costs that exceed the respective storage costs. As such, in some implementations, the storage costs and matching costs are not determined for the remaining candidate container indexes, and all unmatched data units (e.g., data units with fingerprints that were not already matched to fingerprints in previously-selected candidate container indexes) may be stored in non-deduplicated form. In this manner, the received data units may be deduplicated when the associated matching costs are lower than the storage costs, and otherwise may be stored in non-deduplicated form. Accordingly, some implementations may reduce or minimize the overall financial costs incurred by a deduplication storage system using a remote storage service. The disclosed technique for selecting deduplicated storage or non-duplicated storage is discussed further below with reference to FIGS. 1-10.

FIG. 1—Example Storage System

FIG. 1 shows an example of a storage system 100 that includes a storage controller 110. memory 115, and persistent storage 140, in accordance with some implementations. The storage system 100 may be coupled to the remote storage 190 via a network connection. The remote storage 190 may be a network-based persistent storage facility or service (also referred to herein as "cloud-based storage"). In some examples, use of the remote storage 190 may incur financial charges that are based on the number of individual transfers.

The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 may store various data structures at various times, including system retention data 120, storage price data 125, item metadata 130, manifests 150, container indexes 160, and data containers 170. In some examples, copies of the retention data 120, storage price data 125, item metadata 130, manifests 150, container indexes 160, and the data containers 170 may be transferred between the memory 115 and the remote storage 190 (e.g., via read and write input/output (I/O) operations). Further, in some examples, copies of the retention data 120, storage price data 125, item metadata 130, manifests 150, container indexes 160, and the data containers 170 may be transferred between the memory 115, the persistent storage 140, and remote storage 190.

In some implementations, the storage controller 110 may receive an inbound data stream 105 (e.g., a backup item) including multiple data units, and may determine whether to store various data units in a non-deduplicated form (e.g., without performing deduplication) or in a deduplicated form (e.g., after performing deduplication). For example, upon receiving a set of data units, the storage controller 110 may estimate a matching cost (e.g., a cost for performing a matching operation to deduplicate the set of data units) and a storage cost (e.g., a cost to persistently store a non-deduplicated version of the set of data units). If the estimated storage cost exceeds the estimated matching cost, the storage controller 110 may perform deduplication of the set of data units, and may store the set of data units as deduplicated data 180 on the remote storage 190. Otherwise, if the estimated storage cost does not exceed the estimated matching cost, the storage controller 110 may not perform deduplication of the set of data units, and may store the set of data units as non-deduplicated data 185 on the remote storage 190.

In some implementations, when receiving a set of data units (e.g., in the data stream 105), the storage controller 110 may traverse a candidate list in a sorted order (e.g., in descending order of predicted matches to the received data units), and may select one candidate container index 160 at a time. For each selected candidate container index 160, the storage controller 110 may compare the estimated storage cost to the estimated matching cost for that candidate container index 160, and thereby determine whether to perform deduplication using that candidate container index 160 (e.g., by performing a matching operation of the data units against that candidate container index 160). Further, because the candidate container indexes 160 that are selected earlier (e.g., having higher sorted position in the candidate list) are predicted to have higher numbers of matches than the candidate container indexes 160 that are selected later (e.g., having lower sorted positions in the candidate list), it may be predicted that the candidate container indexes 160 that are selected earlier will have a lower estimated matching cost than the candidate container indexes 160 that are selected later. Therefore, upon determining that a currently-selected candidate container index 160 has an estimated matching cost that exceeds the estimated storage cost, all remaining candidate container indexes 160 (e.g., having lower sorted positions than the currently-selected candidate container index 160) may be assumed to also have matching costs that exceed the respective storage costs. As such, in some implementations, the storage costs and matching costs are not determined for the remaining candidate container indexes 160, and all unmatched data units (e.g., data units with fingerprints that were not already matched to fingerprints in previously-selected candidate container indexes 160) may be stored in non-deduplicated form. In this manner, the received data units may be deduplicated when the associated matching costs are lower than the storage costs, and otherwise may be stored in non-deduplicated form. Accordingly, some implementations may reduce or minimize the overall financial costs incurred by using the remote storage 190. An example process for storing data in a deduplicated form or in a non-deduplicated form is discussed further below with reference to FIGS. 4-5.

In some implementations, when performing deduplication of a set of data units (e.g., in response to determining that the storage cost exceeds the matching cost), the storage controller 110 may store at least one copy of each data unit in a data container 170 (e.g., by appending the data units to the end of the data container 170). In some examples, each data container 170 may be divided into entities 175, where each entity 175 includes multiple stored data units. Further, the storage controller 110 may generate a fingerprint for each received data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints in at least one container index. If a match is identified, then the storage controller 110 may determine that a duplicate of the incoming data unit is already stored by the storage system 100. The storage controller 110 may then store references to the previous data unit, instead of storing the duplicate incoming data unit.

In some implementations, when performing deduplication of the set of data units, the storage controller 110 may generate item metadata 130 to represent the backup item in a deduplicated form. Each item metadata 130 may include identifiers for a set of manifests 150, and may indicate the sequential order of the set of manifests 150. The manifests 150 record the order in which the data units were received. Further, the manifests 150 may include a pointer or other information indicating the container index 160 that indexes each data unit. In some implementations, the container index 160 may indicate the location in which the data unit is stored. For example, the container index 160 may include information specifying that the data unit is stored at a particular offset in an entity, and that the entity is stored at a particular offset in a data container 170. Further, the container index 160 may include reference counts that indicate the number of manifests 150 that reference each data unit. After completing the deduplication of the received data, the corresponding item metadata 130, manifests 150, container indexes 160, and the data containers 170 may be persistently stored as deduplicated data 180 on the remote storage 190.

In some implementations, the storage controller 110 may receive a read request to access the stored deduplicated data 180, and in response may access the item metadata 130 and manifests 150 (e.g., via read I/O operations to remote storage 190) to determine the sequence of data units that made up the original data. The storage controller 110 may then use pointer data included in a manifest 150 to identify the container indexes 160 that index the data units. Further, the storage controller 110 may access the identified container indexes 160 (e.g., via read I/O operations to remote storage 190), and may use information included in the identified container indexes 160 (and information included in the manifest 150) to determine the locations that store the data units (e.g., data container 170, entity 175, offsets, etc.). The storage controller 110 may then access the data containers 170 (e.g., via read I/O operations to remote storage 190), and may read the data units from the data containers 170.

In some implementations, the storage price data 125 may be a data structure (e.g., a list, a table, a database, and the like) that stores information regarding the financial costs associated with use of the remote storage 190. For example, the storage price data 125 may specify the financial costs incurred for read I/O transfers of various data sizes, for write I/O transfers of various sizes, for persistent storage in remote storage 190 for various time periods and data sizes, and so forth.

In some implementations, the storage controller 110 may use the storage price data 125 to estimate a matching cost for a received set of data units. For example, the storage controller 110 may determine that performing a matching operation for the set of data units would involve a read I/O to transfer a particular container index 160 from the remote storage 190 to the memory 115, and would also involve a write I/O to transfer the updated container index 160 (e.g., after being updated to include new reference counts or to index new data units) from the memory 115 to the remote storage 190. Further, the storage controller 110 may perform a look-up in the storage price data 125 to determine the financial costs of these I/O transfers, and may thereby estimate the matching cost for the matching operation.

In some implementations, the storage controller 110 may use the storage price data 125 to estimate a storage cost for the received set of data units. For example, the storage controller 110 may estimate that the set of data units will be stored for a particular time period (e.g., corresponding to the amount of time that the set of data units is predicted to be useful in the storage system 100). Further, the storage controller 110 may perform a look-up in the storage price data 125 to determine the financial costs of persistently storing the set of data units as non-deduplicated data 185 on the remote storage 190.

In some implementations, the storage controller 110 may estimate the storage time period for data units using the system retention data 120 and/or the local retention data 165 (included in a container index 160). The system retention data 120 may be a data structure to store information regarding the estimated retention time for all data units used by the storage system 100 and stored on the remote storage 190. Further, the local retention data 165 may be a data structure to store information regarding the estimated retention time for data units indexed by that container index 160. As such, the local retention data 165 may store estimated retention times that correspond to different localities in the data stream (e.g., as represented by different container indexes 160).

In some implementations, the system retention data 120 and/or the local retention data 165 may be generated based on an average of the measured lifespan durations of data units. As used herein, the "lifespan" of a data unit may refer to the time period from the initial storage of the data unit (e.g., after receipt of the data unit in an inbound data stream 105) on the remote storage 190 to the deletion of the same data unit from the remote storage 190. An example process for calculating system and local retention data is discussed further below with reference to FIG. 3.

Figure 2:
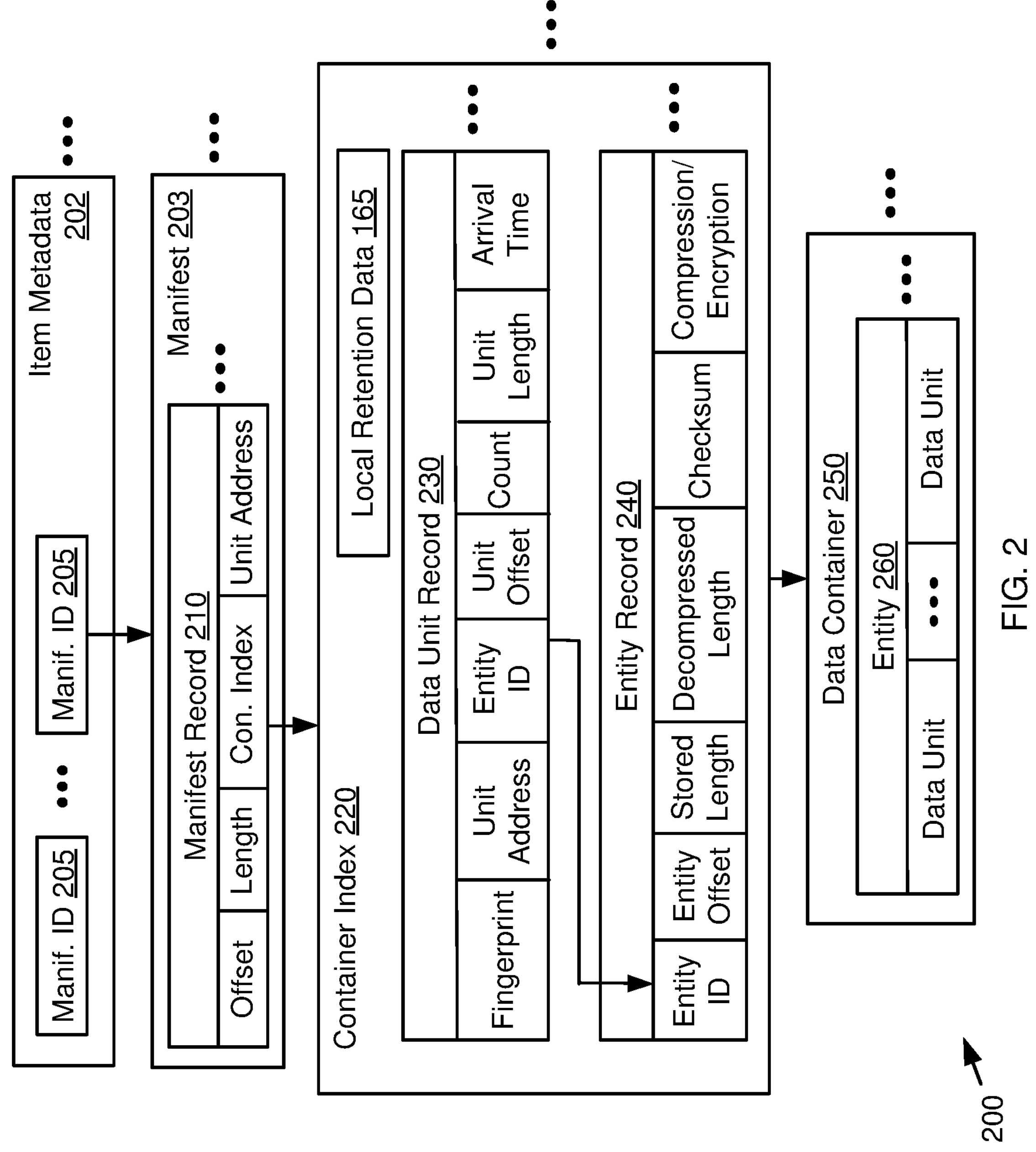
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include item metadata 202, a manifest 203, a container index 220, and a data container 250. In some examples, the item metadata 202, the manifest 203, the container index 220, and the data container 250 may correspond generally to example implementations of item metadata 130, a manifest 150, a container index 160, and a data container 170 (shown in FIG. 1), respectively. In some examples, the data structures 200 may be generated and/or managed by the storage controller 110 (shown in FIG. 1).

In some implementations, the item metadata 202 may include multiple manifests identifiers 205. Each manifests identifier 205 may identify a different manifest 203. In some implementations, the manifests identifiers 205 may be arranged in a stream order (i.e., based on the order of receipt of the data units represented by the identified manifests 203).

Although one of each is shown for simplicity of illustration in FIG. 2, data structures 200 may include a plurality of instances of item metadata 202, each including or pointing to one or more manifests 203. In such examples, data structures 200 may include a plurality of manifests 203. The manifests 203 may reference a plurality of container indexes 220, each corresponding to one of a plurality of data containers 250. Each container index 220 may comprise one or a plurality of data unit records 230, and one or a plurality of entity records 240. Further, in some implementations, a container index 220 may include local retention data 165. The local retention data 165 may be a data structure to store information regarding the estimated retention time for data units identified by the data unit records 230 included in the container index 220. An example process for generating the local retention data 165 is discussed further below with reference to FIG. 3.

As shown in FIG. 2, in some examples, each manifest 203 may include one or more manifest records 210. Each manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, a unit length, and an arrival time. The reference count value may indicate the number of manifest records 210 that reference the data unit record 230. In some implementations, the arrival time (e.g., stored in the data unit record 230) may record the data and time that the data unit is received by the storage system. In other implementations, the arrival time may indicate the data and time that the data unit record 230 was created to record information regarding the received data unit.

In some implementations, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Figure 3:
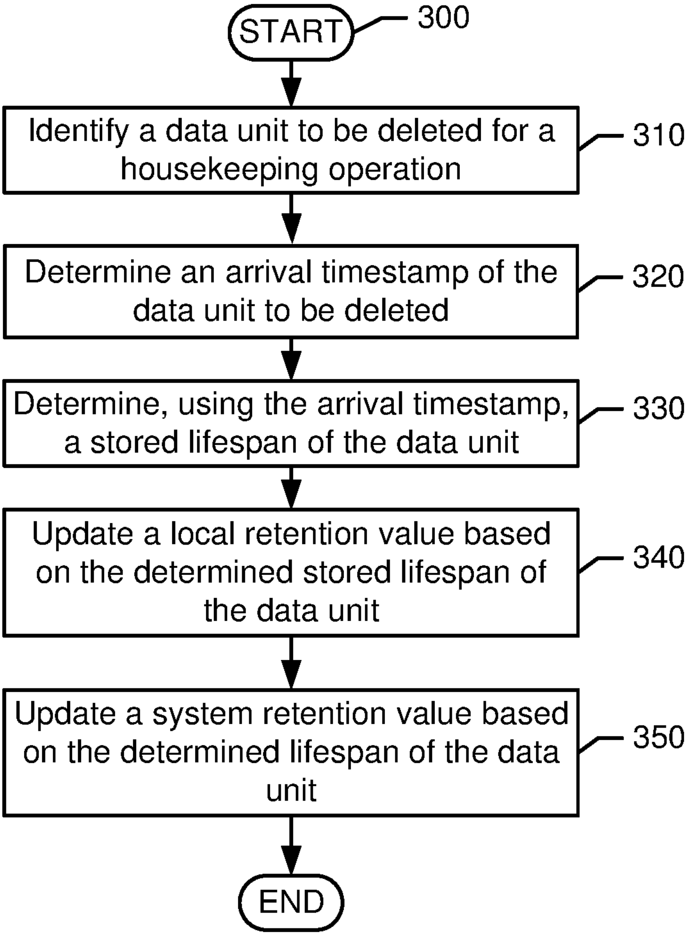
FIG. 3 is an illustration of an example process, in accordance with some implementations.

FIG. 3—Example Processes for Generating Retention Data

FIG. 3 shows is an example process 300 for generating retention data, in accordance with some implementations. For the sake of illustration, details of the process 300 may be described below with reference to FIGS. 1-2, which show examples in accordance with some implementations. However, other implementations are also possible. In some examples, the process 300 may be performed using the storage controller 110 (shown in FIG. 1). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 310 may include identifying a data unit to be deleted for a housekeeping operation. For example, referring to FIGS. 1-2, the storage controller 110 initiates a housekeeping job to delete a backup item. The storage controller 110 uses the item metadata 202 to identify at a manifest 203 included in the backup item. The storage controller 110 then uses the manifest 203 to obtain address information identifying a data unit to be deleted, and to obtain an identifier for the container index 250 that indexes the data unit to be deleted.

Block 320 may include determining an arrival timestamp of the data unit to be deleted. Block 330 may include determining, using the arrival timestamp, a stored lifespan of the data unit. For example, referring to FIGS. 1-2, the storage controller 110 reads the data unit record 230 (included in the identified container index 250) to obtain the arrival time of the data unit to be deleted. The storage controller 110 then calculates the stored lifespan of the data unit as the time elapsed from the arrival time to the present time (i.e., the time at which the data unit is deleted from the storage system 100).

Block 340 may include updating a local retention value based on the determined stored lifespan of the data unit. For example, referring to FIGS. 1-2, the storage controller 110 adds the lifespan of the data unit (determined at block 330) to a first set of lifespans for the container index 250 (e.g., a set of lifespans of multiple data units that were previously indexed by the container index 250). The storage controller 110 then calculates an average value (e.g., a rolling average) of the first set of lifespans, and updates the local retention data 165 to store or indicate the average value of the first set of lifespans.

Block 350 may include updating a system retention value based on the determined lifespan of the data unit. After block 350, the process 300 may be completed. For example, referring to FIGS. 1-2, the storage controller 110 adds the lifespan of the data unit (determined at block 330) to a second set of lifespans for all data units that were previously stored in the storage system 100. The storage controller 110 then calculates an average value of the second set of lifespans, and updates the second set of lifespans to store or indicate the average value of the second set of lifespans.

Figure 4:
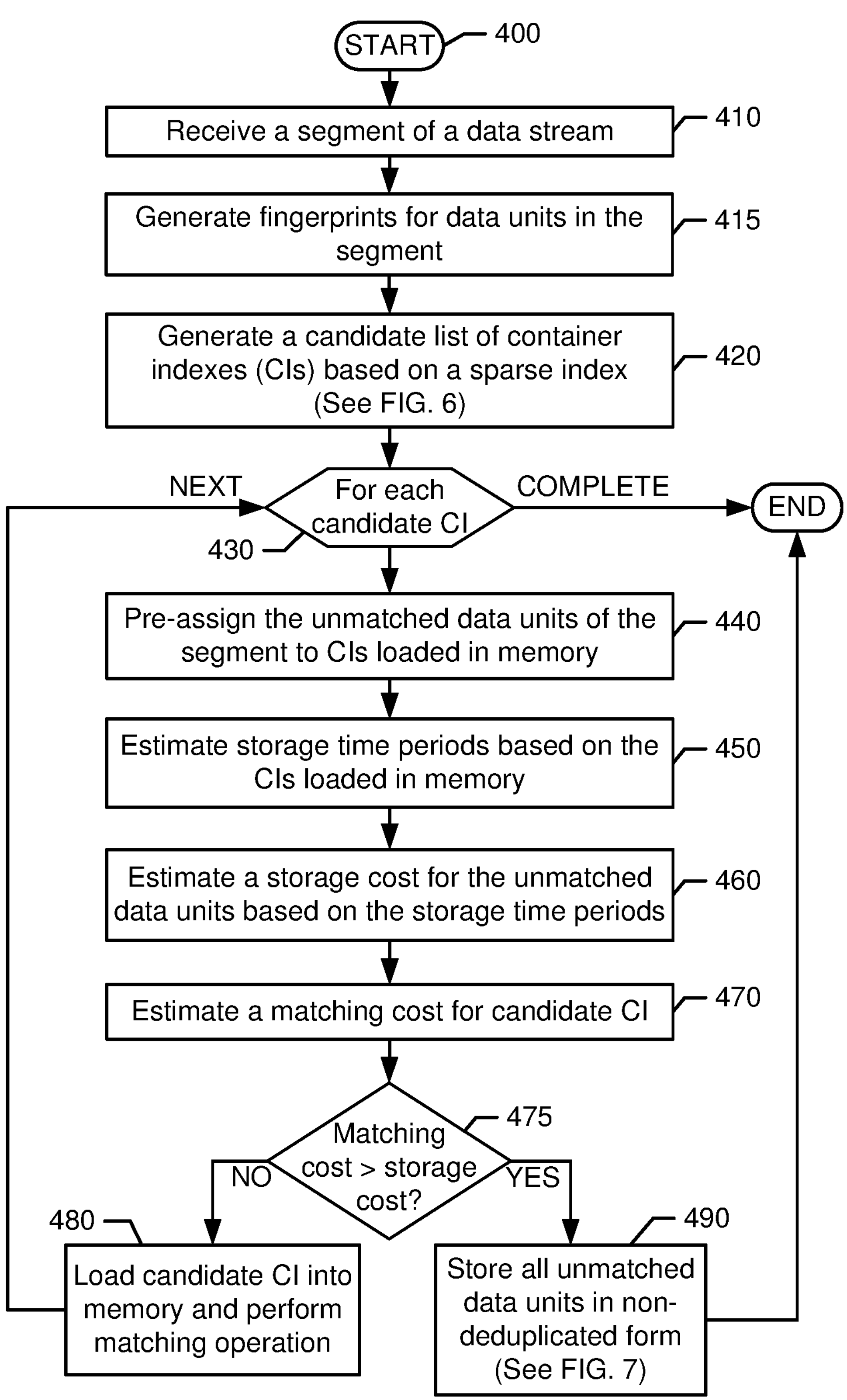
FIG. 4 is an illustration of an example process, in accordance with some implementations.
Figure 5A:
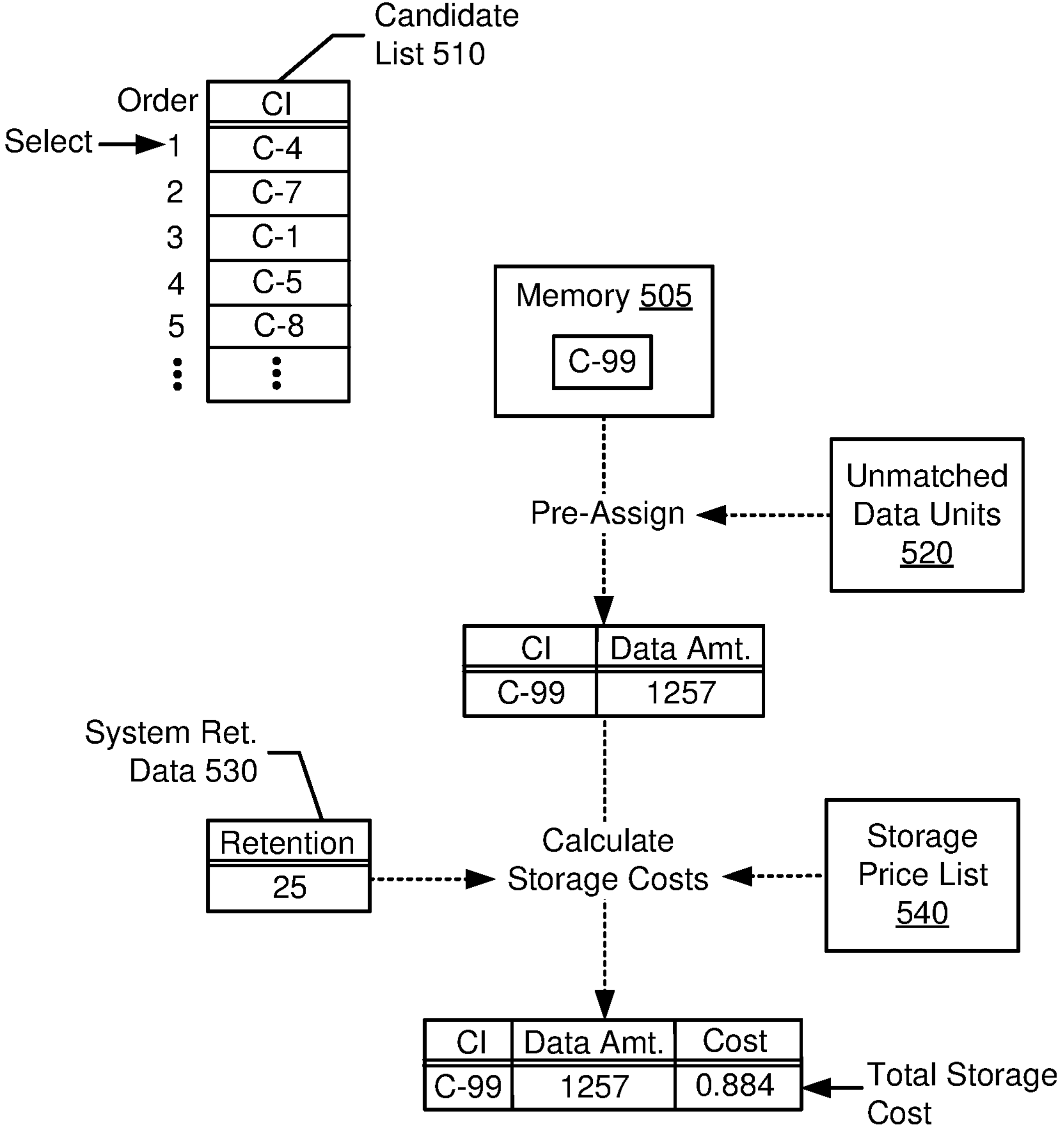
FIGS. 5A-5B are illustrations of example operations, in accordance with some implementations.
Figure 5B:
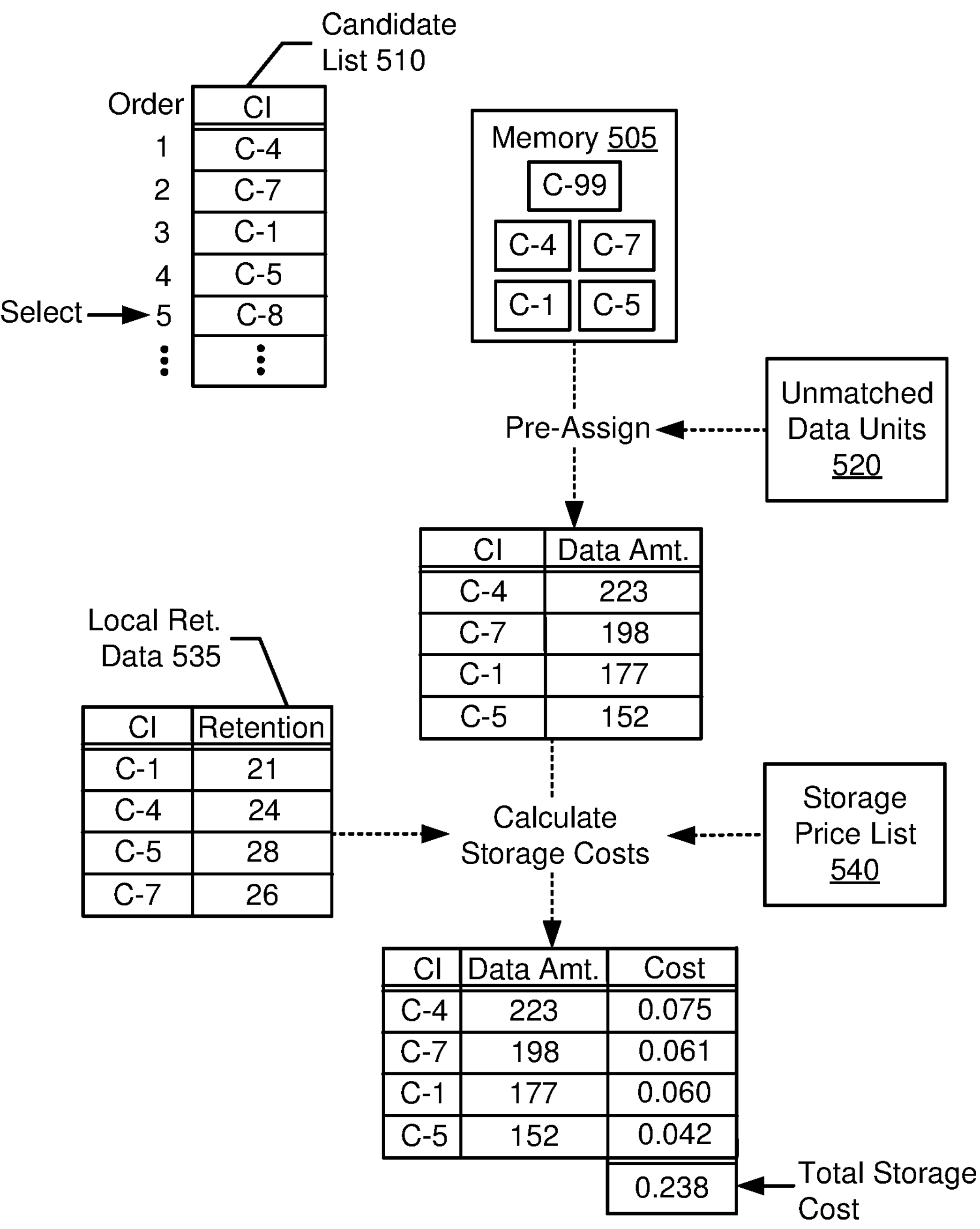

FIGS. 4 and 5A-5B—Example Processes for Storing Data

FIG. 4 shows is an example process 400 for storing data, in accordance with some implementations. For the sake of illustration, details of the process 400 may be described below with reference to FIGS. 5A-5B, which show example operations in accordance with some implementations. However, other implementations are also possible. In some examples, the process 400 may be performed using the storage controller 110 (shown in FIG. 1). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 410 may include receiving a segment of a data stream. Block 415 may include generating fingerprints for data units in the segment. For example, referring to FIG. 1, the storage controller 110 receives a data segment (e.g., a continuous set of data units) to be stored in the storage system 100, and generates fingerprints for the data units in the segment.

Block 420 may include generating a candidate list of container indexes (CIs) based on a sparse index. For example, referring to FIG. 1, the storage controller 110 identifies a set or list of container indexes (referred to herein as a "candidate list") to use for matching operations for the segment (i.e., for fingerprints of data blocks of the segment). In some examples, the candidate list may be sorted in a decreasing order of the predicted number of matches to be found in each listed container index for the data segment. An example expansion of block 420 (e.g., an example process for generating a candidate list) is described below with reference to FIG. 6.

At block 430, a loop (defined by blocks 430-480) may be entered to process the candidate container indexes (CIs) in the candidate list. Block 440 may include pre-assigning the unmatched data units of the segment to CIs loaded in memory. Block 450 may include determining estimated time periods for the unmatched data units based on the CIs loaded in memory. Block 460 may include estimating a storage cost for the unmatched data units based on the estimated storage time periods for the unmatched data units. As used herein, the term "pre-assigning" refers to attempting an initial mapping of unmatched data units (e.g., data units with fingerprints that were not already matched to fingerprints in candidate CIs) to any candidate CIs that are currently loaded in memory. In some implementations, pre-assigning an unmatched data unit may include evaluating a defined range of data units (referred to as the "stream window") that surrounds the unmatched data unit in the data stream, and identifying any candidate CI that is a dominant match in the stream window (i.e., a candidate CI that has been matched to the most data units in the stream window). For example, the stream window used for pre-assignment may include the ten data units that directly precede the unmatched data unit in the data stream, and may also include the ten data units that directly follow the unmatched data unit in the data stream. If a candidate CI is identified as the dominant match in the stream window, the unmatched data unit may be pre-assigned to the identified candidate CI. Otherwise, if no dominant match is identified in the stream window, the unmatched data unit may be pre-assigned to a seeding CI (also referred to as an "expansion CI") that is loaded in memory. In some implementations, the seeding CI is used to index new data units, and is not included in the candidate list (e.g., is not used for matching operations) during the process 400.

Referring now to FIG. 5A, shown is a first example operation corresponding generally to blocks 440-460 (shown in FIG. 4). A storage controller (e.g., storage controller 110 shown in FIG. 1) begins a traversal of a candidate list 510 by selecting the first (i.e., highest-sorted) candidate CI "C-4." The storage controller then attempts to pre-assign the unmatched data units 520 to any candidate CIs loaded in memory 505. However, in the example shown in FIG. 5A, no matching operations have yet occurred for the candidate list 510 (e.g., because the first candidate CI "C-4" is currently selected), and therefore the memory 505 does not yet include any candidate CIs. Accordingly, the storage controller pre-assigns all of the unmatched data units 520 to a seeding CI "C-99" that is used for indexing new data units. Further, the storage controller may use the system retention data 530 to estimate a storage time period for the unmatched data units 520. For example, if the system retention data 530 indicates that the average retention time for the storage system is 25 days, the storage controller may calculate that each of the unmatched data units 520 will be stored for 25 days. The storage controller may then use the storage price list 540 to determine the total storage cost of storing all of the unmatched data units 520 for 25 days (e.g., as non-deduplicated data 185 on the remote storage 190, as shown in FIG. 1). In some implementations, the system retention data 530 may be recorded in a dedicated data structure that is stored in the storage system (e.g., in system retention data 120 included in storage system 100, as shown in FIG. 1).

Referring now to FIG. 5B, shown is a second example operation corresponding generally to blocks 440-460 (shown in FIG. 4). The storage controller selects the fifth candidate CI "C-8." The storage controller then attempts to pre-assign the remaining unmatched data units 520 to any candidate CIs loaded in memory 505. Note that, in the example shown in FIG. 5B, matching operations have been performed for the preceding candidate CIs in the candidate list 510, and therefore the memory 505 currently includes the candidate CIs "C-4," "C-7," "C-1," and "C-5." Accordingly, as shown in FIG. 5B, the storage controller pre-assigns the remaining unmatched data units 520 to the candidate CIs "C-4," "C-7," "C-1," and "C-5." Further, the storage controller uses these pre-assignments and the local retention data 535 to estimate storage times period for the unmatched data units 520. For example, the storage controller may perform a look-up to the local retention data 535, and may thereby estimate that the data units pre-assigned to container "C-4" (e.g., 223 data units) will be stored for 24 days. In another example, the storage controller may perform a look-up to the local retention data 535, and may thereby estimate that the data units pre-assigned to container "C-1" (e.g., 177 data units) will be stored for 21 days. The storage controller then uses the storage price list 540 to determine the total storage cost of storing the remaining unmatched data units 520 (e.g., based on the number of data units that are pre-assigned to the candidate CIs loaded in memory and their respective estimated storage periods). In some implementations, the local retention data 535 may be obtained by reading local retention values included in the candidate CIs loaded in memory (e.g., by reading local retention data 165 included in container index 160, as shown in FIG. 1). In other implementations, the local retention data 535 may be stored together with the system retention data 530 in a dedicated data structure (e.g., in system retention data 120 included in storage system 100 shown in FIG. 1).

Referring again to FIG. 4, block 470 may include estimating a matching cost for the current candidate CI (e.g., the candidate CI being processed in the current iteration of the loop). For example, referring to FIG. 1, the storage controller 110 determines that the matching operation for the remaining unmatched data units would include performing a read I/O to transfer the current candidate CI from the remote storage 190 to the memory 115, and would also include performing a write I/O to transfer the updated candidate CI from the memory 115 to the remote storage 190. The storage controller 110 then performs a look-up in the storage price data 125 to determine the financial costs of the read I/O transfer and the write I/O transfer, and thereby estimates the matching cost for the matching operation.

Decision block 475 may include determining whether the matching cost (estimated at block 470) exceeds the storage cost (estimated at block 460). If not ("NO"), the process 400 may continue at block 480, including loading the current candidate CI into memory and performing a matching operation. After block 480, the process 400 may return to block 430 to perform another iteration of the loop (e.g., to process another CI in the candidate list). If all iterations of the loop are completed (e.g., all CIs in the candidate list have been processed), the process 400 may be completed. For example, referring to FIG. 1, the storage controller 110 determines that the estimated matching cost does not exceed the estimated storage cost, and in response loads the candidate container index 160 into memory 115 from the remote storage 190 (e.g., via a read I/O transfer). The storage controller 110 compares the fingerprints of the unmatched data units (e.g., generated at block 420) to the fingerprints included in the candidate container index 160 loaded in memory 115. If a match is identified for a data unit, the storage controller 110 increments the reference count in the candidate container index 160 that represents the matched data unit. Further, the storage controller 110 stores a reference to the matched data unit (e.g., in a manifest 150) in deduplicated form, rather than storing a new copy of the incoming data unit in a data container 170.

However, if it determined at decision block 475 that the matching cost exceeds the storage cost ("YES"), the process 400 may continue at block 490, including storing all unmatched data units in non-deduplicated form. After block 490, the process 400 may be completed. For example, referring to FIG. 1, the storage controller 110 determines that the estimated matching cost exceeds the estimated storage cost, and in response stores the remaining unmatched data units as non-deduplicated data 185 in remote storage 190 (e.g., without performing any further deduplication of the remaining unmatched data units). An example expansion of block 490 (e.g., an example process for storing data in non-deduplicated form) is described below with reference to FIG. 7.

Figure 6:
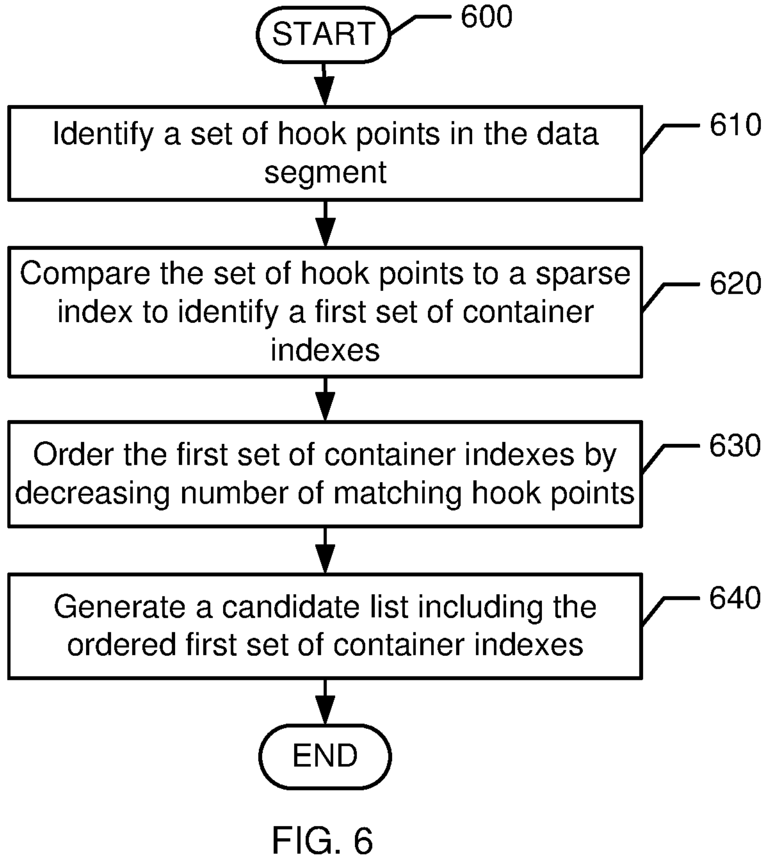
FIG. 6 is an illustration of an example process, in accordance with some implementations.

FIG. 6—Example Processes for Generating a Candidate List

FIG. 6 shows is an example process 600 for generating a candidate list, in accordance with some implementations. The process 600 may illustrate an example expansion of block 420 (shown in FIG. 4). Accordingly, in some implementations, the process 600 may be performed after generating fingerprints for data units in a received data segment (e.g., at block 415 in FIG. 4). For the sake of illustration, details of the process 600 may be described below with reference to FIG. 1, which shows an example system in accordance with some implementations. However, other implementations are also possible. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 610 may include identifying a set of hook points in a received data segment. Block 620 may include comparing the set of hook points to a sparse index to identify a first set of container indexes. Block 630 may include ordering the first set of container indexes by decreasing number of matching hook points. Block 640 may include generating a candidate list including the ordered first set of container indexes.

For example, referring to FIG. 1, the storage controller 110 receives an inbound data stream, and divides the data stream into segments that each include multiple data units. The storage controller 110 then determines a set of hook points in each segment (e.g., a subset of fingerprints that meet a sparse fingerprint condition or algorithm). The storage controller 110 compares the hook points of the data segment to the hook points stored in a sparse index (e.g., a data structure to map hook points of data units to the data containers 170 that include the stored versions of those data units). The storage controller 110 identifies each container index 160 that is mapped to at least one hook point of the segment in the sparse index. Further, the storage controller 110 counts the number of hook points that are mapped to each container index 160, and sorts the container indexes 160 according to the number of hook points. The storage controller 110 then generates a candidate list that includes identifiers of the container indexes 160 sorted according to the number of hook points.

Figure 7:
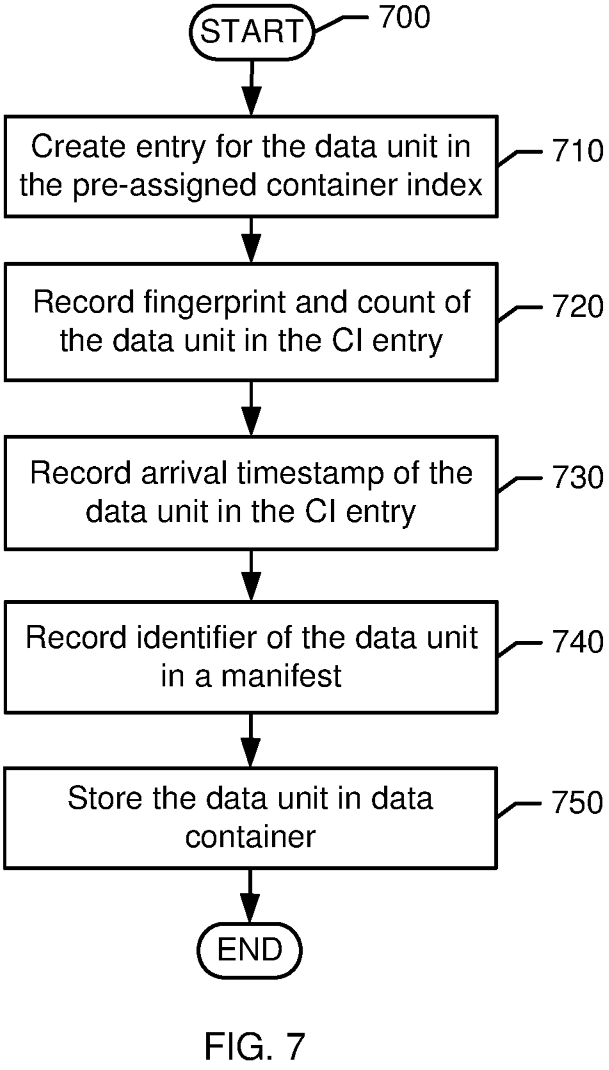
FIG. 7 is an illustration of an example process, in accordance with some implementations.

FIG. 7—Example Processes for Storing Data in Non-Deduplicated Form

FIG. 7 shows is an example process 700 for storing data in non-deduplicated form, in accordance with some implementations. The process 700 may illustrate an example expansion of block 490 (shown in FIG. 4). Accordingly, in some implementations, the process 700 may be performed after determining that the estimated matching cost exceeds the estimated storage cost (e.g., at decision block 475 in FIG. 4). For the sake of illustration, details of the process 700 may be described below with reference to FIG. 1, which shows an example system in accordance with some implementations. However, other implementations are also possible. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include creating a new entry for the data unit in the pre-assigned container index (CI). Block 720 may include recording a fingerprint and a count of the data unit in the container index entry. Block 730 may include recording an arrival timestamp of the data unit in the container index entry. Block 740 may include recording an identifier of the data unit in a manifest. Block 750 may include storing the data unit in a data container.

For example, referring to FIGS. 1-2, the storage controller 110 determines that an estimated matching cost exceeds an estimated storage cost, and in response initiates a process to store any unmatched data units as non-deduplicated data 185 in remote storage 190. For each unmatched data unit, the storage controller 110 creates a data unit record 230 to store information regarding the data unit. The storage controller 110 creates the data unit record 230 in the container index 220 that is pre-assigned to the data unit (e.g., at block 440 shown in FIG. 4). The storage controller 110 populates the fingerprint of the data unit in the data unit record 230, and increments the reference count in the data unit record 230. Further, the storage controller 110 record the arrival timestamp of the data unit in the data unit record 230. The storage controller 110 record an identifier of the data unit in a manifest 203, and stores the data unit in a data container 250.

FIG. 8—Example Computing Device

FIG. 8 shows a schematic diagram of an example computing device 800. In some examples, the computing device 800 may correspond generally to some or all of the storage system 100 (shown in FIG. 1). As shown, the computing device 800 may include a hardware processor 802, a memory 804, and machine-readable storage 805 including instructions 810-840. The machine-readable storage 805 may be a non-transitory medium. The instructions 810-840 may be executed by the hardware processor 802, or by a processing engine included in hardware processor 802.

Instruction 810 may be executed to receive a stream of data units to be stored in a persistent storage of a deduplication storage system. Instruction 820 may be executed to determine an estimated matching cost of performing, on a set of data units of the received stream, a matching process of a deduplication operation of the deduplication storage system to generate a deduplicated version of the set of data units. For example, referring to FIG. 1, the storage controller 110 receives a data segment to be stored in the storage system 100 (e.g., in data stream 105). The storage controller 110 determines that the matching operation for the data units would include performing a read I/O to transfer a container index 160 from the remote storage 190 to the memory 115, and would also include performing a write I/O to transfer the updated container index 160 from the memory 115 to the remote storage 190. The storage controller 110 then performs a look-up in the storage price data 125 to determine the financial costs of the read I/O transfer and the write I/O transfer, and thereby estimates the matching cost for the matching operation.

Instruction 830 may be executed to determine an estimated storage cost of a non-deduplicated version of the set of data units that has not been deduplicated via the deduplication operation. For example, referring to FIG. 5B, a storage controller pre-assigns the remaining unmatched data units 520 to the candidate CIs “C-4,” “C-7,” “C-1,” and “C-5.” Further, the storage controller uses these pre-assignments and the local retention data 535 to estimate storage times period for the unmatched data units 520. The storage controller then uses the storage price list 540 to determine the total storage cost of storing the remaining unmatched data units 520 (e.g., based on the number of data units that are pre-assigned to the candidate CIs loaded in memory and their respective estimated storage periods).

Figure 9:
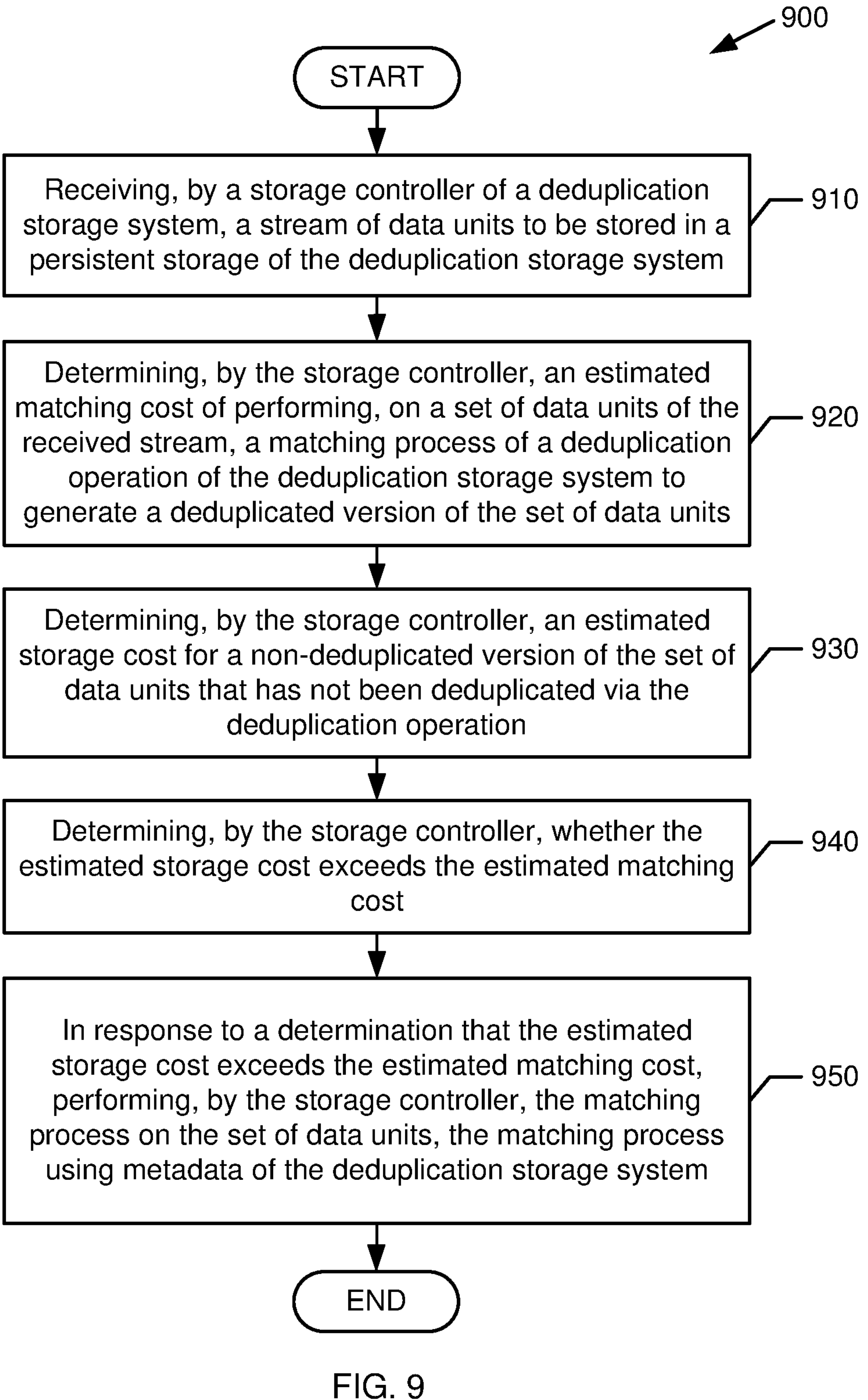
FIG. 9 is an illustration of an example process, in accordance with some implementations.

Instruction 840 may be executed to, in response to a determination that the estimated storage cost exceeds the estimated matching cost, perform the matching process on the set of data units, the matching process using the metadata of the deduplication storage system. For example, referring to FIG. 1, the storage controller 110 determines that the estimated matching cost does not exceed the estimated storage cost, and in response loads the candidate container index 160 into memory 115 from the remote storage 190 (e.g., via a read I/O transfer). The storage controller 110 compares the fingerprints of the unmatched data units to the fingerprints included in the candidate container index 160 loaded in memory 115. If a match is identified for a data unit, the storage controller 110 increments the reference count in the candidate container index 160 that represents the matched data unit. Further, the storage controller 110 stores a reference to the matched data unit in a manifest 150 in deduplicated form FIG. 9—Example Process for Storing Data FIG. 9 shows is an example process 900 for storing data, in accordance with some implementations. In some examples, the process 900 may be performed using the storage controller 110 (shown in FIG. 1). The process 900 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 910 may include receiving, by a storage controller of a deduplication storage system, a stream of data units to be stored in a persistent storage of the deduplication storage system. Block 920 may include determining, by the storage controller, an estimated matching cost of performing, on a set of data units of the received stream, a matching process of a deduplication operation of the deduplication storage system to generate a deduplicated version of the set of data units.

Block 930 may include determining, by the storage controller, an estimated storage cost for a non-deduplicated version of the set of data units that has not been deduplicated via the deduplication operation. Block 940 may include determining, by the storage controller, whether the estimated storage cost exceeds the estimated matching cost. Block 950 may include, in response to a determination that the estimated storage cost exceeds the estimated matching cost, performing, by the storage controller, the matching process on the set of data units, the matching process using metadata of the deduplication storage system.

Figure 10:
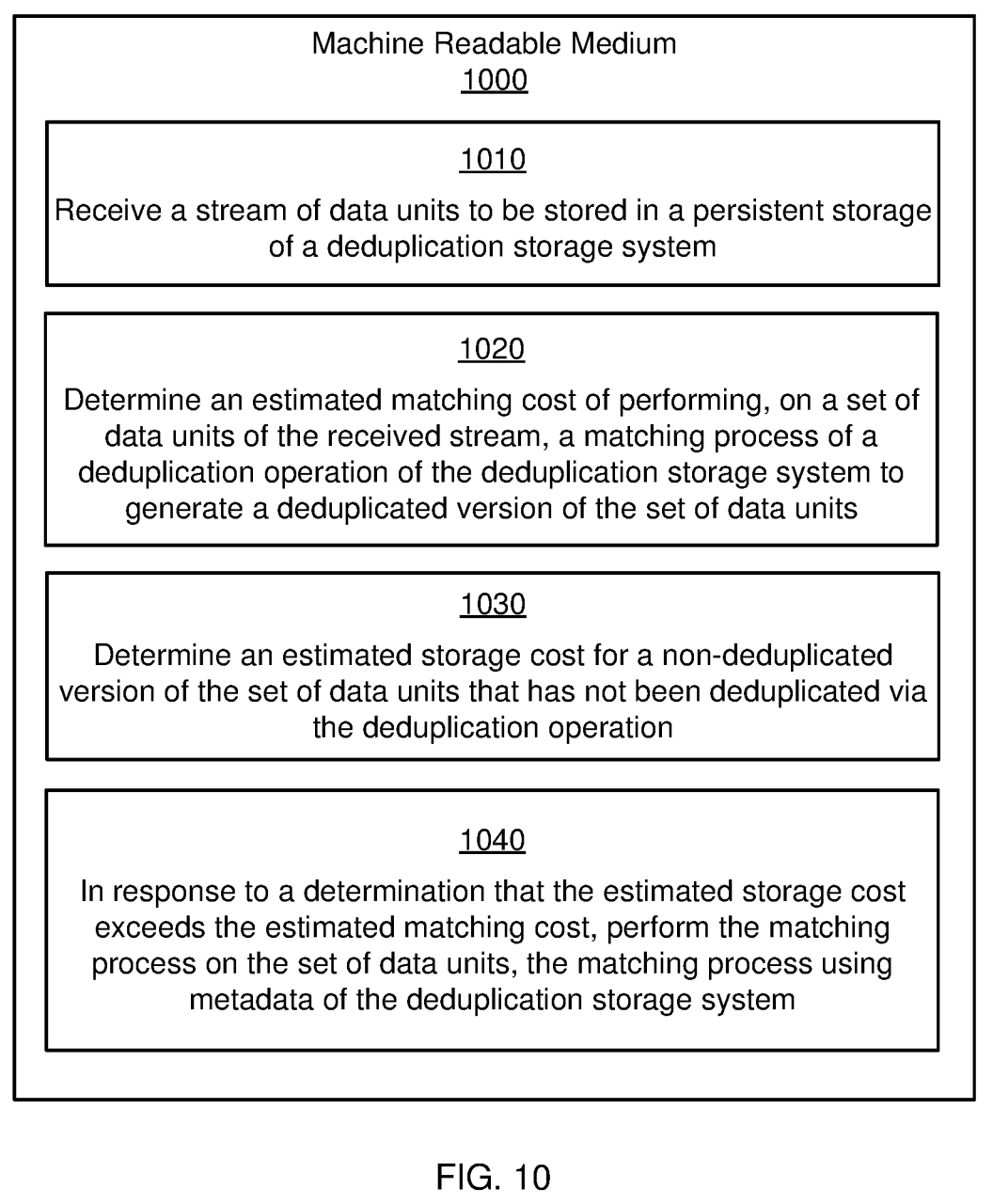

FIG. 10—Example Machine-Readable Medium

FIG. 10 shows a machine-readable medium 1000 storing instructions 1010-1040, in accordance with some implementations. The instructions 1010-1040 can be executed by a single processor, multiple processors, a single processing engine, multiple processing engines, and so forth. The machine-readable medium 1000 may be a non-transitory storage medium, such as an optical, semiconductor, or magnetic storage medium.

Instruction 1010 may be executed to receive a stream of data units to be stored in a persistent storage of a deduplication storage system. Instruction 1020 may be executed to determine an estimated matching cost of performing, on a set of data units of the received stream, a matching process of a deduplication operation of the deduplication storage system to generate a deduplicated version of the set of data units.

Instruction 1030 may be executed to determine an estimated storage cost of a non-deduplicated version of the set of data units that has not been deduplicated via the deduplication operation. Instruction 1040 may be executed to, in response to a determination that the estimated storage cost exceeds the estimated matching cost, perform the matching process on the set of data units, the matching process using the metadata of the deduplication storage system.

In accordance with some implementations of the present disclosure, a controller of a deduplication storage system may estimate a matching cost to deduplicate received data units. Further, the deduplication storage system may estimate a storage cost to store a non-deduplicated version of the data units in persistent storage. In some implementations, the deduplication storage system may determine the estimated storage cost based at least on information regarding the estimated retention time associated with different container indexes (e.g., corresponding to different localities in the data stream). If the estimated storage cost exceeds the estimated matching cost, the deduplication storage system may perform the matching operation on the data units to generate a deduplicated version of the data units. Otherwise, if the estimated storage cost does not exceed the estimated matching cost, the deduplication storage system may not perform the matching operation, but instead may store a non-deduplicated version of the data units in persistent storage. In this manner, the received data units may be deduplicated when the associated matching costs are lower than the storage costs, and otherwise may be stored in non-deduplicated form. Accordingly, some implementations may reduce or minimize the overall financial costs incurred by a deduplication storage system using a remote storage service.

Note that, while FIGS. 1-10 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:

a processor;

a memory; and a machine-readable storage storing instructions, the instructions executable by the processor to:

receive a stream of data units to be stored in a persistent storage of a deduplication storage system;

determine an estimated matching cost of performing, on a set of data units of the received stream, a matching process of a deduplication operation of the deduplication storage system to generate a deduplicated version of the set of data units;

determine an estimated storage cost of a non-deduplicated version of the set of data units that has not been deduplicated via the deduplication operation; and in response to a determination that the estimated storage cost exceeds the estimated matching cost, perform the matching process on the set of data units, the matching process using the metadata of the deduplication storage system.

2. The computing device of claim 1, including instructions executable by the processor to:

in response to a determination that the estimated storage cost does not exceed the estimated matching cost, store the non-deduplicated version of the set of data units in the persistent storage.

3. The computing device of claim 1, including instructions executable by the processor to:

generate a candidate list of container indexes for performing the matching process on the set of data units, wherein the set of data units is a data segment of the received stream;

initiate a traversal of the candidate list;

select, in the traversal of the candidate list, a first candidate container index of the candidate list;

determine the estimated matching cost based on at least one transfer cost for the selected first candidate container index;

in response to the determination that the estimated storage cost exceeds the estimated matching cost:

load the selected first candidate container index from the persistent storage into a memory; and perform the matching process using the selected first candidate container index loaded in the memory.

4. The computing device of claim 3, including instructions executable by the processor to:

after performing the matching process using the selected first candidate container index loaded in the memory, select, in the traversal of the candidate list, a second candidate container index in the candidate list;

determine a second estimated storage cost for a non-deduplicated version of a set of unmatched data units, wherein the set of unmatched data units comprises one or more data units, of the set of data units, that were not matched in the matching process performed using the selected first candidate container index;

determine a second estimated matching cost of performing, on the set of unmatched data units, a second matching process based on at least one transfer cost for the selected second candidate container index;

in response to a determination that the second estimated storage cost does not exceed the second estimated matching cost:

store the non-deduplicated version of the set of unmatched data units in the persistent storage; and exit the traversal of the candidate list.

5. The computing device of claim 4, including instructions executable by the processor to:

in response to a determination that the second estimated storage cost exceeds the second estimated matching cost:

load the selected second candidate container index from the persistent storage into the memory; and perform the second matching process using the selected second candidate container index loaded in the memory.

6. The computing device of claim 1, including instructions executable by the processor to:

identify a first data unit to be deleted for a housekeeping operation, wherein the first data unit is indexed in a third container index;

in response to an identification of the first data unit to be deleted for the housekeeping operation:

determine an arrival timestamp of the first data unit to be deleted;

determine, using the arrival timestamp, a stored lifespan of the first data unit;

update a local retention value based on the determined stored lifespan of the first data unit, wherein the updated local retention value is associated with the third container index; and update a system retention value based on the determined stored lifespan of the first data unit.

7. The computing device of claim 6, including instructions executable by the processor to:

determine the estimated storage cost of the non-deduplicated version of the set of data units based at least on the updated local retention value, wherein at least one of the set of data units is associated with the third container index.

8. The computing device of claim 6, including instructions executable by the processor to:

in response to an initial receipt of the first data unit to be stored in the deduplication storage system:

record a fingerprint of the first data unit in the third container index; and record the arrival timestamp of the first data unit in the third container index.

9. A method comprising:

receiving, by a storage controller of a deduplication storage system, a stream of data units to be stored in a persistent storage of the deduplication storage system;

determining, by the storage controller, an estimated matching cost of performing, on a set of data units of the received stream, a matching process of a deduplication operation of the deduplication storage system to generate a deduplicated version of the set of data units;

determining, by the storage controller, an estimated storage cost for a non-deduplicated version of the set of data units that has not been deduplicated via the deduplication operation;

determining, by the storage controller, whether the estimated storage cost exceeds the estimated matching cost; and in response to a determination that the estimated storage cost exceeds the estimated matching cost, performing, by the storage controller, the matching process on the set of data units, the matching process using metadata of the deduplication storage system.

10. The method of claim 9, comprising:

generating a candidate list of container indexes for performing the matching process on the set of data units, wherein the set of data units is a data segment of the received stream;

initiating a traversal of the candidate list;

selecting, in the traversal of the candidate list, a first candidate container index of the candidate list;

determining the estimated matching cost based on at least one transfer cost for the selected first candidate container index;

determining whether the estimated storage cost exceeds the estimated matching cost;

in response to the determination that the estimated storage cost exceeds the estimated matching cost:

loading the selected first candidate container index from the persistent storage into a memory; and performing the matching process using the selected first candidate container index loaded in the memory.

11. The method of claim 10, comprising:

after performing the matching process using the selected first candidate container index loaded in the memory, selecting, in the traversal of the candidate list, a second candidate container index in the candidate list;

determining a second estimated storage cost for a non-deduplicated version of a set of unmatched data units, wherein the set of unmatched data units comprises one or more data units, of the set of data units, that were not matched in the matching process performed using the selected first candidate container index;

determining a second estimated matching cost of performing, on the set of unmatched data units, a second matching process based on at least one transfer cost for the selected second candidate container index;

determining whether the second estimated storage cost exceeds the second estimated matching cost;

in response to a determination that the second estimated storage cost does not exceed the second estimated matching cost:

storing the non-deduplicated version of the set of unmatched data units in the persistent storage; and exiting the traversal of the candidate list.

12. The method of claim 9, comprising:

identifying a first data unit to be deleted for a housekeeping operation, wherein the first data unit is indexed in a third container index;

in response to an identification of the first data unit to be deleted for the housekeeping operation:

determining an arrival timestamp of the first data unit to be deleted;

determining, using the arrival timestamp, a stored lifespan of the first data unit;

updating a local retention value based on the determined stored lifespan of the first data unit, wherein the updated local retention value is associated with the third container index; and updating a system retention value based on the determined stored lifespan of the first data unit.

13. The method of claim 12, comprising:

determining the estimated storage cost of the non-deduplicated version of the set of data units based at least on the updated local retention value, wherein at least one of the set of data units is associated with the third container index.

14. The method of claim 12, comprising:

in response to an initial receipt of the first data unit to be stored in the deduplication storage system:

recording a fingerprint of the first data unit in the third container index; and recording the arrival timestamp of the first data unit in the third container index.

15. A non-transitory machine-readable medium storing instructions that upon execution cause a processor to:

receive a stream of data units to be stored in a persistent storage of a deduplication storage system;

determine an estimated matching cost of performing, on a set of data units of the received stream, a matching process of a deduplication operation of the deduplication storage system to generate a deduplicated version of the set of data units;

determine an estimated storage cost of a non-deduplicated version of the set of data units that has not been deduplicated via the deduplication operation; and in response to a determination that the estimated storage cost exceeds the estimated matching cost, perform the matching process on the set of data units, the matching process using the metadata of the deduplication storage system.

16. The non-transitory machine-readable medium of claim 15, including instructions that upon execution cause the processor to:

generate a candidate list of container indexes for performing the matching process on the set of data units, wherein the set of data units is a data segment of the received stream;

initiate a traversal of the candidate list;

select, in the traversal of the candidate list, a first candidate container index of the candidate list;

determine the estimated matching cost based on at least one transfer cost for the selected first candidate container index;

in response to the determination that the estimated storage cost exceeds the estimated matching cost:

load the selected first candidate container index from the persistent storage into a memory; and perform the matching process using the selected first candidate container index loaded in the memory.

17. The non-transitory machine-readable medium of claim 16, including instructions that upon execution cause the processor to:

after performing the matching process using the selected first candidate container index loaded in the memory, select, in the traversal of the candidate list, a second candidate container index in the candidate list;

determine a second estimated storage cost for a non-deduplicated version of a set of unmatched data units, wherein the set of unmatched data units comprises one or more data units, of the set of data units, that were not matched in the matching process performed using the selected first candidate container index;

determine a second estimated matching cost of performing, on the set of unmatched data units, a second matching process based on at least one transfer cost for the selected second candidate container index;

in response to a determination that the second estimated storage cost does not exceed the second estimated matching cost:

store the non-deduplicated version of the set of unmatched data units in the persistent storage; and exit the traversal of the candidate list.

18. The non-transitory machine-readable medium of claim 15, including instructions that upon execution cause the processor to:

identify a first data unit to be deleted for a housekeeping operation, wherein the first data unit is indexed in a third container index;

in response to an identification of the first data unit to be deleted for the housekeeping operation:

determine an arrival timestamp of the first data unit to be deleted;

determine, using the arrival timestamp, a stored lifespan of the first data unit;

update a local retention value based on the determined stored lifespan of the first data unit, wherein the updated local retention value is associated with the third container index; and update a system retention value based on the determined stored lifespan of the first data unit.

19. The non-transitory machine-readable medium of claim 18, including instructions that upon execution cause the processor to:

determine the estimated storage cost of the non-deduplicated version of the set of data units based at least on the updated local retention value, wherein at least one of the set of data units is associated with the third container index.

20. The non-transitory machine-readable medium of claim 18, including instructions that upon execution cause the processor to:

in response to an initial receipt of the first data unit to be stored in the deduplication storage system:

record a fingerprint of the first data unit in the third container index; and record the arrival timestamp of the first data unit in the third container index.

* * * * *